United States Patent [19]
Golin

[11] Patent Number: 6,058,143
[45] Date of Patent: May 2, 2000

[54] MOTION VECTOR EXTRAPOLATION FOR TRANSCODING VIDEO SEQUENCES

[75] Inventor: Stuart Jay Golin, East Windsor, N.J.

[73] Assignee: Thomson Licensing S.A., Boulogne Cedex, France

[21] Appl. No.: 09/027,140

[22] Filed: Feb. 20, 1998

[51] Int. Cl.[7] .............................. H04B 1/66; H04N 7/12
[52] U.S. Cl. ......................... 375/240; 348/405; 348/434; 348/446; 348/384
[58] Field of Search .................................... 348/384, 416, 348/402, 423, 446, 448, 409, 410, 412, 413, 414, 556, 558, 441, 405, 473, 722, 913, 434; 709/232; 375/240; H04B 1/66

[56] References Cited

U.S. PATENT DOCUMENTS

| | | | |
|---|---|---|---|
| 5,268,751 | 12/1993 | Geiger et al. | 348/446 |
| 5,438,368 | 8/1995 | Hutter | 348/434 |
| 5,530,484 | 6/1996 | Bhatt et al. | 348/556 |
| 5,537,440 | 7/1996 | Eyuboglu et al. | 348/405 |
| 5,541,852 | 7/1996 | Eyuboglu et al. | 348/405 |
| 5,544,266 | 8/1996 | Koppelmans et al. | 348/402 |
| 5,708,473 | 1/1998 | Mead | 348/416 |
| 5,805,224 | 9/1998 | Keesman et al. | 348/405 |

FOREIGN PATENT DOCUMENTS

| | | |
|---|---|---|
| 0 637 893 A1 | 2/1995 | European Pat. Off. . |
| 0 696 873 A2 | 2/1996 | European Pat. Off. . |
| 96/23388 | 8/1996 | WIPO . |
| 98/19460 | 5/1998 | WIPO . |

OTHER PUBLICATIONS

PCT Search Report.
Stottelder, "Bridging Standards For Digital Television Broadcast", Aug. 3, 1995, pp. 626–633.
Shen, "Adaptive Motion Vector Resampling for Compressed Video Down–Scaling", Oct. 26, 1997, pp. 771–774.

*Primary Examiner*—Vu Le
*Assistant Examiner*—Gias Philippe
*Attorney, Agent, or Firm*—Joseph S. Tripoli; Ronald H. Kurdyla; Vincent E. Duffy

[57] ABSTRACT

A transcoding method is performed by receiving a first bitstream of compressed image data having identifiable coding parameters. These parameters may relate to the GOP structure of pictures represented in the first bitstream, the size of the pictures represented in the first bitstream, whether the pictures represented in the first bitstream are field or frame pictures, and/or whether the pictures represented in the first bitstream define a progressive or interlaced sequence. First motion information is obtained from the first bitstream, and is used to extrapolate second motion information for a second bitstream of compressed image data. The second bitstream, which has one or more parameters different from the parameters of the first bitstream, is provided as a transcoded output.

22 Claims, 2 Drawing Sheets

MOTION VECTOR EXTRAPOLATION FOR TRANSCODING VIDEO SEQUENCES

GOVERNMENT LICENSE RIGHTS

The United States Government has a paid-up license in this invention and the right in limited circumstances to require the patent owner to license others on reasonable terms as provided for by the terms of contract number 70NANB5H1174 awarded by the National Institute of Standards and Technology.

FIELD OF THE INVENTION

The present invention generally relates to motion estimation in the transcoding of a video sequence, and more particularly, to a technique for transcoding a received video sequence by using extrapolated motion information from the received video sequence, thereby minimizing or eliminating motion estimation from the transcoding process.

BACKGROUND OF THE INVENTION

Data compression techniques enable large quantities of data to be transmitted over relatively small bandwidths. The algorithms used in a compression system depend on the available bandwidth or storage capacity, the features required by the application, and the affordability of the hardware required for implementation of the compression algorithm (encoder as well as decoder). The moving pictures expert group-type 2 ("MPEG-2") compression standard, which is hereby incorporated by reference, is a well-known technique for compressing video data. Motion estimation, which is the process video encoders use for calculating motion vectors, is generally considered the most expensive part of the encoding process. Similarly, motion estimation is likely to be the most expensive part of a transcoding process in which a video sequence is decoded, and then re-encoded with new parameters. With the advent of high-definition television ("HDTV"), this is a significant concern since television studios will be required to transcode MPEG-2 bitstreams of picture data from one format to another. For example, television studios accommodating the HDTV standard must be able to transcode an MPEG-2 bitstream from one group of pictures ("GOP") structure to another, from one picture size to another, and/or from one bit rate to another. There may be instances where these studios will need to transcode MPEG-2 pictures from field pictures to frame pictures, or from frame pictures to field pictures. There may also be instances where the studios will need to transcode MPEG-2 pictures from an interlaced sequence to a progressive sequence, or from a progressive sequence to an interlaced sequence. Transcoding may also be used to perform a "cropping" function wherein an input represents a main image, and the transcoded output represents a sub-image within the main image.

SUMMARY OF THE INVENTION

Therefore, it is an object of the present invention to provide a technique for transcoding a video sequence that minimizes or eliminates motion estimation.

It is another object to provide a technique for transcoding a video sequence in which motion information from an input bitstream is utilized to generate motion vectors for a transcoded output bitstream.

It is still another object to provide a motion estimation technique for the transcoding process that supports all of the MPEG-2 prediction modes.

These and other objects can be achieved in accordance with the principles of the present invention with a transcoding method performed by receiving a first bitstream of compressed image data having identifiable coding parameters. These parameters may relate to the GOP structure of pictures represented in the first bitstream, the size of the pictures represented in the first bitstream, whether the pictures represented in the first bitstream are field or frame pictures, and/or whether the pictures represented in the first bitstream define a progressive or interlaced sequence. First motion information is obtained from the first bitstream, and is used to extrapolate second motion information for a second bitstream of compressed image data. The second bitstream, which has one or more parameters different from the parameters of the first bitstream, is provided as a transcoded output.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
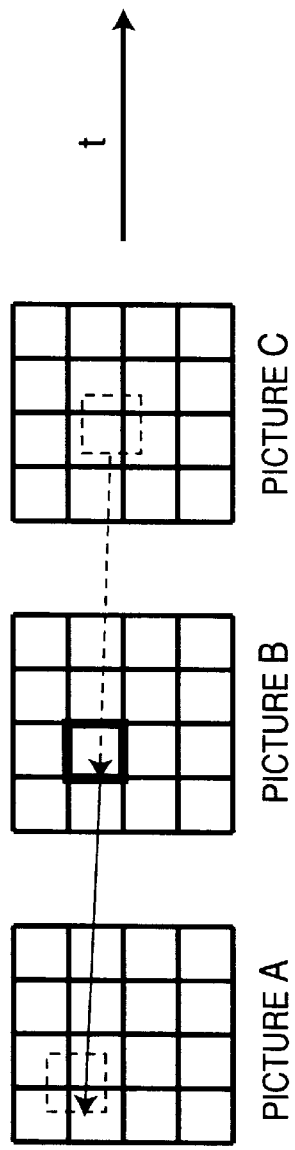
FIG. 1 illustrates the basic principles of motion vector extrapolation.

Turning now to the drawings and referring to FIG. 1, the basic principles of motion vector extrapolation are illustrated. In general, motion vector extrapolation is a technique for estimating motion for an image in a video sequence when motion is known elsewhere in the sequence. In FIG. 1, the bold-typed square in picture B represents an individual block of pixels (a.k.a., pels) within a video picture. Each block within the picture is assumed to have a fixed position. In MPEG-2, these blocks are referred to as "macroblocks", and each one consists of a 16×16 block of pixels. The solid arrow in FIG. 1 represents the known motion of the bold-typed block as the block moves from picture A to picture B. Actually, it is the imagery within the block that moves, not the block itself, which is in a fixed position. This known motion, defined by a motion vector, is used to extrapolate the block's motion as it moves from picture B to picture C. The dashed arrow in FIG. 1 represents the extrapolated motion vector. The arrows in FIG. 1 actually point in a direction opposite to the motion since FIG. 1 (as well as the other attached drawings) use the more common coding convention in which the vector associated with a block points to the "source" of that block in the reference picture. In practice, a given motion vector is represented as a set of x and y coordinates which respectively indicate the horizontal and vertical motion of a block between two pictures. Extrapolation generally assumes that motion is uniform in time and "smooth" in space. Accordingly, the block in picture B is expected to move to the position shown in picture C, and all blocks it overlaps are expected to have approximately the same motion.

Figure 2:
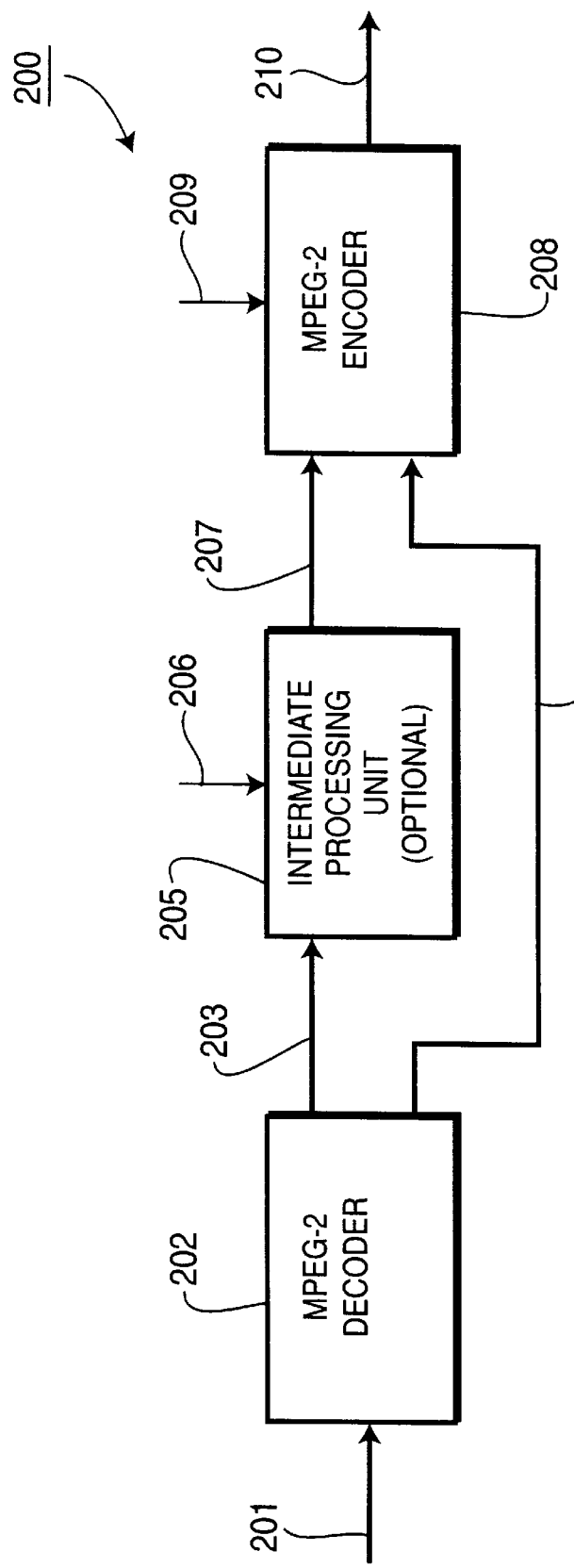
FIG. 2 illustrates a transcoding system constructed according to the principles of the present invention.

Referring now to FIG. 2, a transcoding system constructed according to the principles of the present invention is shown. In FIG. 2, the transcoding system receives an input bitstream 201 of MPEG-2 compressed image data. This input bitstream 201, which exhibits a particular bit rate, represents pictures of a given size and GOP structure. The picture data of the input bitstream 201 may consist of field or frame pictures, and may represent a progressive or interlaced sequence. An MPEG-2 decoder 202, which is known in the art, receives the input bitstream 201 and decodes the same to generate an output of decompressed, digital image data 203. Decoder 202 also provides the motion information (i.e., motion vectors) from the input bitstream 201 as a separate output 204. The digital image data 203 is input to an intermediate processing unit 205, which operates in the pixel domain and is capable of resizing the pictures represented by the digital image data 203 in a known manner. In addition to picture resizing, the intermediate processing unit 205 can perform the known cropping function by isolating a sub-image within the main image represented by the digital image data 203, and providing output of data representative of the sub-image. The intermediate processing unit 205 is also capable of performing known interlacing and de-interlacing operations, which are necessary when transcoding a progressive sequence of pictures into an interlaced sequence of pictures, and when transcoding an interlaced sequence of pictures into a progressive sequence of pictures. The intermediate processing unit 205 performs its operations in response to an external input 206 that indicates which (if any) of the processing operations is to be performed, and further indicates the parameters to be used in such processing. Since the operations of the intermediate processing unit 205 are optional, if picture resizing, cropping, interlacing and de-interlacing are not performed for a given transcoding application, the intermediate processing unit 205 simply operates as a pass-through unit, and provides output of digital image data 207 without any pixel domain processing. In this case, digital image data 207 and digital image data 203 are obviously the same. Alternatively, if one or more of these processing operations is to be performed for a given transcoding application, the intermediate processing unit 205 performs the pixel domain processing operation(s) and provides output of the resulting processed, digital image data 207. The digital image data 207, whether or not processed by intermediate processing unit 205, is input to an MPEG-2 encoder 208 which re-encodes the received image data 207 with new parameters indicated by an external input 209. For example, the encoder 208 may encode the digital image data 207 to represent pictures of a GOP structure different from the GOP structure of the pictures represented by the input bitstream 201, and/or may adjust the bit rate. The encoder 208 may also encode the digital image data 207 as field or frame pictures. To perform the encoding process, encoder 208 uses the motion information in output 204 from decoder 202 to extrapolate motion vectors for the pictures being re-encoded. Thereafter, the re-encoded pictures are provided from the transcoding system 200 as an output bitstream 210 of MPEG-2 compressed, digital image data.

As previously indicated, this output bitstream 210 may represent a picture size and GOP structure different from the size and GOP structure of the input bitstream 201, and the bit rate of the output bitstream 210 may be controlled to be different from the bit rate of the input bitstream 201. Moreover, the output bitstream 210 may represent field pictures while the input bitstream 201 represents frame pictures, or the output bitstream 210 may represent frame pictures while the input bitstream 201 represents field pictures. Similarly, the output bitstream 210 may represent an interlaced sequence while the input bitstream 201 represents a progressive sequence, or the output bitstream 210 may represent a progressive sequence while the input bitstream 201 represents an interlaced sequence. Also, the output bitstream 210 may represent a "cropped"version of the input bitstream 201. In essence, the transcoding system 200 receives the input bitstream 201 having certain parameters, and transcodes the input bitstream 201 to generate the output bitstream 210 having one or more parameters different from the parameters of the input bitstream 201. This transcoding system 200 is unique in that it uses motion information from the input bitstream 201 to extrapolate motion information for the output bitstream 210.

Figure 3:
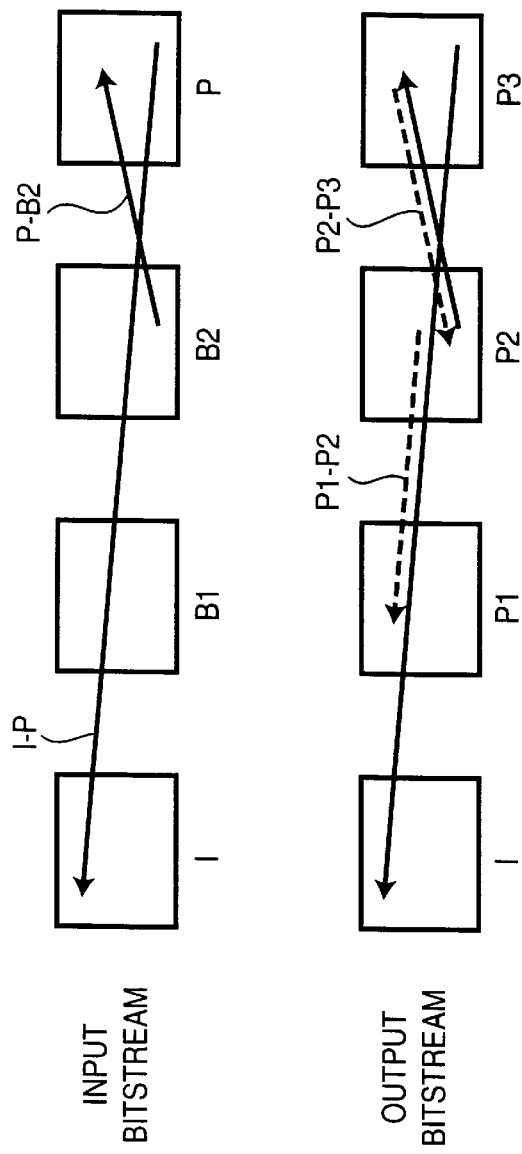
FIG. 3 illustrates the process of transcoding pictures from one GOP structure to another according to the principles of the present invention.

Turning now to FIG. 3, the process of transcoding pictures from one GOP structure to another according to the principles of the present invention is illustrated. In FIG. 3, an input bitstream represents pictures having a GOP structure of: an intra-coded picture ("I-picture"), a bidirectionally-predictive coded picture ("B-picture"), a B-picture, and a predictive-coded picture ("P-picture"). That is, the input bitstream represents an "IBBP"GOP structure. As indicated in FIG. 3, the two successive B-pictures of the input bitstream are labeled as B1 and B2 for clarity. This input bitstream is analogous to the input bitstream 201 in FIG. 2. During the transcoding process, the input bitstream having an "IBBP"GOP structure is converted to an output bitstream having an "IPPP" GOP structure. As indicated in FIG. 3, the three successive P-pictures of the output bitstream are labeled as P1, P2 and P3 for clarity. This output bitstream is analogous to the output bitstream 210 in FIG. 2. To minimize clutter, the macroblocks that make up the individual pictures are not shown in FIG. 3. To perform the transcoding process, the I-P and P-B2 motion vectors from the input bitstream are utilized to extrapolate motion vectors for the output bitstream. For example, as FIG. 3 indicates, the I-P motion vector from the input bitstream can be used to estimate a P1-P2 motion vector for the output bitstream. Similarly, the P-B2 motion vector from the input bitstream can be used to estimate a P2-P3 motion vector for the output bitstream.

Figure 4:
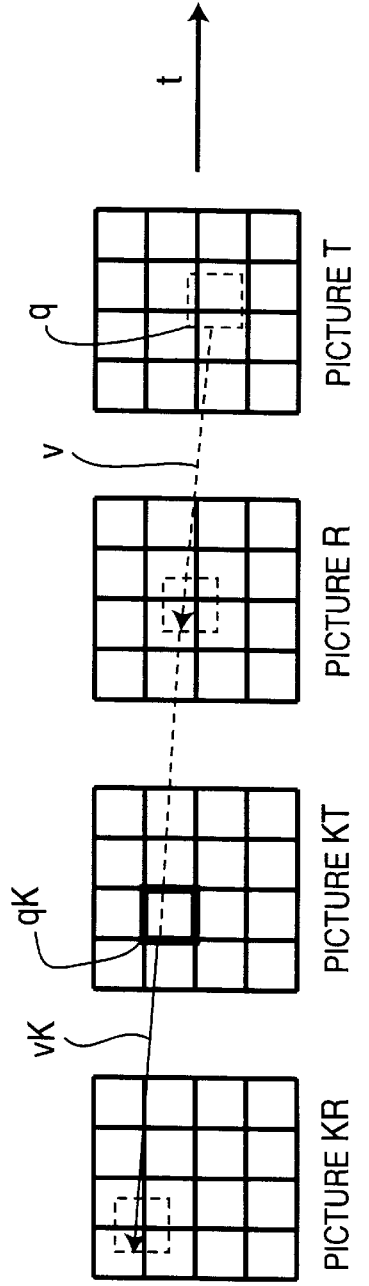
FIG. 4 illustrates the general case of motion vector extrapolation, and can be used to better understand motion vector extrapolation as applied to transcoding.

A more detailed explanation of the motion vector extrapolation process of the present invention will now be provided with reference to FIG. 4, which shows four pictures in a video sequence. Conceptually, these four pictures will exist in the output bitstream as well as the input bitstream, and this will usually be the case in fact. In any case, in FIG. 4, picture T is the "target" picture whose motion relative to picture R is to be determined. Both of these pictures will exist in the output bitstream. Pictures KR and KT are pictures whose relative motion is known from the input bitstream. According to the principles of the present invention, the known motion between pictures KR and KT can be used to extrapolate motion vectors for the output bitstream. Pictures KR and KT are referred to as a "base pair", and pictures R and T are referred to as a "current pair". Several base pairs may be useful to estimate the motion for a current pair. In general, any base pair temporally close to the current pair is potentially useful for this purpose.

During the transcoding process, there may be instances where some blocks in picture T do not receive motion extrapolation information. That is, there may be instances where some blocks in picture T are not overlapped by the motion of any blocks in nearby base pairs. Such blocks in picture T can simply be intra-coded, or their motion can be calculated in a conventional manner. Alternatively, the motion of such blocks can be inferred or interpolated from nearby blocks. In most cases, however, several blocks in base pairs will overlap most of the blocks in picture T, and the task is then to select the best motion vector from among several candidate motion vectors. Each overlapping block from a base pair provides a single candidate motion vector. When selecting from among multiple candidate motion vectors, it is useful to attach a weight to each motion vector, and select the motion vector having the greatest weight. Using the pictures of FIG. 4 as an example, the weight for each candidate motion vector (MV) is calculated as follows:

Total Weight (MV) = (1)
   (Overlap Weight)*(Picture Weight)*(Rounding Weight)
where,
Overlap Weight = (the number of pixels in a block of picture KT (2)
   that overlap pixels in the corresponding block of picture T)
Picture Weight = 1/[1 + abs(Temporal Weight)] (3)
where,
Temporal Weight = (tKT − tKR)*[(tKR + tKT) − (tT + tR)] (4)
and,
Rounding Weight = [1 − (horizontal rounding error)]* (5)
   [1 − (vertical rounding error)]

In the foregoing equations (1) through (5), tKR, tKT, tR and tT represent the display times of pictures KR, KT, R and T, respectively. The terms * and abs represent the multiplication operator and the absolute value designation, respectively. The horizontal and vertical rounding errors occur when the extrapolated vector is rounded to the nearest half pixel, and accordingly, each takes on a value from zero (0) to one-half (½). Although equations (1) through (5) are shown as applied to the pictures of FIG. 4, it should be intuitive that these general equations can be applied to other picture configurations.

In addition to the technique of simply selecting the candidate motion vector having the greatest weight, the present invention contemplates other ways of obtaining the best motion vector(s) for a given block. According to an alternative embodiment, one can calculate the weighted average where the weights are computed using the foregoing equations (1) through (5). Using these weights, the best motion vector can then be calculated on a component basis through multiplying the weights by the x or y components of the corresponding motion vectors to generate weighted components, summing the weighted components, and dividing the sum of the weighted components by a sum of the weights.

The foregoing weighted average technique can also be performed on a "cluster" basis. That is, if an x-y plotting of the candidate motion vectors shows more than one cluster (i.e., close grouping) of motion vectors, a best motion vector can be calculated for each cluster. This is the centroid, or "center of mass" of the cluster. A final best motion vector can then be selected from the best motion vectors of the individual clusters.

It should be noted that a best motion vector can also be selected from among a plurality of candidate motion vectors without using weights at all. For example, mean-square error (MSE) or mean-absolute-difference (MAD) calculations representing pixel differences between blocks can be performed to identify the best motion vector. The use of MSE and MAD calculations is, of course, well known to those skilled in the art.

The following algorithm listed in Table 1 shows the steps for finding the best motion vector for each possible prediction mode of a target picture (e.g., picture T in FIG. 4). These steps, which are represented by pseudo-code, can be programmed in any programming language known to those skilled in the art.

TABLE 1

Pseudo-Code For Finding The Best Motion Vector

-for each prediction mode to be considered for target picture (current pair)
   -for each field or frame of the applicable mode
    (top field, bottom field, frame)
      -initialize a table indexed by blocks in target picture
      -for each base pair considered useful for a current pair
      (e.g., a base pair is generally considered "useful"
      if it is temporally nearby within a preset range)
         -for each motion vector of each inter-coded block in the
         target of the base pair
            -determine where the vector moves the block to in
            the target picture
            -calculate the vector's weight, or evaluate its match
            (e.g., MSE, MAD)
            -store info in table entries of relevant target picture
            blocks
      -for each block in target picture
         -determine best motion vector for field or frame
-for each block in target picture
   -determine best prediction mode and corresponding motion
   vector(s)

Note that multiple motion vectors are associated with a given block in some prediction modes, such as field prediction for frame pictures and dual prime for P-pictures. Also, for B-pictures, the encoder must decide for each block whether to use forward prediction, backward prediction or both. In some cases no prediction mode produces acceptable results. This occurs when there are no candidate motion vectors, or when the best motion vector determined in accordance within one of the foregoing techniques is not good enough for the particular application. Additionally, there are instances where the encoder can simply use the motion vectors (unchanged) from the input sequence for the output sequence.

Assume in FIG. 4 a situation using frame prediction for frame pictures, with no resizing. Given that a block in picture KT has an associated vector, vK, then one or more blocks in picture T will have an associated vector, v, defined as follows:

$$v = Tv * vK \quad (6)$$

where, $$Tv = (tT - tR)/(tKT - tKR) \quad (7)$$

Here, Tv is the temporal scaling factor for vectors, and tKR, tKT, tR and tT represent the display times of pictures KR, KT, R and T, respectively. There is an ambiguity in the display times for frame pictures whose fields are displayed at different times. In such cases, the times should be the averages of the respective fields. To track the motion of a block from picture KT to picture T, consider a point at the upper left hand corner of the particular block. In the context of FIG. 4, this point is represented as point qK in picture KT, and as point q in picture T. The motion of the point q is given by:

$$q = qK - (Tb * vK) \quad (8)$$

where, $$Tb = (tT - tKT)/(tKT - tKR) \quad (9)$$

In a transcoding process involving resized pictures, pictures KR and KT will not have the same size as pictures R and T. Resizing is accommodated as follows. Let Rx and Ry represent the horizontal and vertical enlargements of the pictures, respectively. That is:

$$Rx = (\text{width of picture T})/(\text{width of picture KT}) \quad (10)$$

and, $$Ry = (\text{height of picture T})/(\text{height of picture KT}) \quad (11)$$

The resizing of pictures requires equations (6) and (8) to be modified as follows:

$$v = R(Tv * vK) \quad (12)$$

and, $$q = R(qK - (Tb * vK)) \quad (13)$$

The foregoing equations introduce the notation:

$$R(V) = (Vx * Rx, Vy * Ry) \quad (14)$$

where V is a two-component point (pixel) or vector. Note that R refers to different pictures sizes, not to different block sizes.

Resizing applies not only to resized images, but also to relating field and frame pictures, and to relating field and frame prediction. To accommodate field prediction (of both field and frame pictures), note that the bottom fields are 0.5 pixels lower than their coordinates would indicate. The displacement vector, dX, of a field or frame picture is defined as follows:

$$dX = (0,0) \text{ if X is a top field or a frame} \quad (15)$$

and, $$dX = (0, 0.5) \text{ if X is a bottom field} \quad (16)$$

Applying this to equations (12) and (13), the new equations for v and q become:

$$v = R(Tv * (vK + dKR - dKT)) + dT - dR \quad (17)$$

and, $$q = R(qK + dKT - [Tb * (vK + dKR - dKT)]) - dT \quad (18)$$

Therefore, the final equations used in the practice of the present invention are equations (7), (9) and (14) through (18).

Finally, suppose the intermediate processing unit 205 of FIG. 2 crops the images. The above equations can be applied as follows. We consider pictures R and T to be the same size as the original, with the output images imbedded in them at the appropriate location. This location defines the region of interest. Only blocks that overlap the region of interest are used in extrapolation. Then, FIGS. 1 through 4, as well as the equations derived from them, apply to this case.

The foregoing disclosure may suggest homogeneity; that is, if picture T is a frame picture using field-based prediction, then picture KT is also a frame picture using field-based prediction. However, the previously discussed formulas are more general, as the following examples illustrate.

Suppose picture T uses frame-based prediction, and picture KT uses field-based prediction. In the present invention, it does not matter whether picture KT is a field or frame picture. In either case, picture KT's motion vectors are field based, so that Ry=2 and Rx=1. If picture KT is a frame picture, its blocks are 16×8; however, that is transparent to the foregoing formulas. If a block uses 16×8 prediction, then its two halves should be treated as two separate blocks.

Suppose next that both picture T and picture KT use field-based prediction. Here, since vectors in both pictures refer to images of the same size, resizing is not required and Rx=Ry=1. That is, in the practice of the present invention it is irrelevant to the equations whether there is a mix of field and frame pictures, or of field and frame prediction.

As implied by the foregoing disclosure, if a block in picture KT uses dual-prime, then its two vectors are applied separately, perhaps with different weights. Also, evaluating picture T for dual-prime is much like evaluating the same for bi-directional interpolation. That is, each vector is evaluated separately, and then the combination is evaluated. Accordingly, the present invention supports all of the MPEG-2 prediction modes: frame, field and dual prime prediction for frame pictures; and field, dual prime and 16×8 prediction for field pictures.

It is noted that the equations disclosed herein are generally directed towards situations of linear motion, rather than non-linear motion. Non-linear motion can result, for example, from camera jitter or uniform acceleration of objects in pictures. Such instances of non-linear motion can be handled as follows. For non-linear motion associated with camera jitter, it may be desirable to factor out the global motion before comparing block motion. The known MSE and MAD calculations can be used for this purpose. For non-linear motion associated with the uniform acceleration of objects, it may be desirable to extrapolate this motion using three pictures, rather than two.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made without departing from the central scope thereof. Therefore, it is intended that the present invention not be limited to the particular embodiment disclosed as the best mode contemplated for carrying out the invention, but that the present invention includes all embodiments falling within the scope of the appended claims.

What is claimed is:

1. A transcoding method, comprising the steps of:
    receiving a first bitstream of compressed data having a first group of pictures (GOP) structure;
    obtaining first and second motion information from the first bit stream;
    weighting the first and second motion information;
    utilizing the first motion information to extrapolate third motion information for a second bitstream of compressed data if the first motion information outweighs the second motion information, the second bitstream having a second group of pictures (GOP) structure different from the first group of pictures (GOP) structure; and
    outputting the second bitstream.

2. The method as claimed in claim 1, further comprising a step of controlling a bit rate of the second bitstream so that a bit rate of the first bitstream is different from the bit rate of the second bitstream.

3. The method as claimed in claim 1, further comprising a step of adjusting a size of pictures represented by the first bitstream so that pictures represented by the second bitstream exhibit a size different from the size of the pictures represented by the first bitstream.

4. The method as claimed in claim 2, further comprising a step of adjusting a size of pictures represented by the first bitstream so that pictures represented by the second bitstream exhibit a size different from the size of the pictures represented by the first bitstream.

5. The method as claimed in claim 4, further comprising a step of encoding the pictures represented by the second bitstream as field pictures when the pictures represented by the first bitstream are encoded as frame pictures.

6. The method as claimed in claim 4, further comprising a step of encoding the pictures represented by the second bitstream as frame pictures when the pictures represented by the first bitstream are encoded as field pictures.

7. The method as claimed in claim 4, further comprising a step of interlacing the pictures represented by the first bitstream when the pictures represented by the first bitstream are received as a progressive sequence so that the pictures represented by the second bitstream are output as an interlaced sequence.

8. The method as claimed in claim 4, further comprising a step of de-interlacing the pictures represented by the first bitstream when the pictures represented by the first bitstream are received as an interlaced sequence so that the pictures represented by the second bitstream are output as a progressive sequence.

9. The method as claimed in claim 1, further comprising a step of encoding pictures represented by the second bitstream as field pictures when pictures represented by the first bitstream are encoded as frame pictures.

10. The method as claimed in claim 1, further comprising a step of encoding pictures represented by the second bitstream as frame pictures when pictures represented by the first bitstream are encoded as field pictures.

11. The method as claimed in claim 1, further comprising a step of interlacing pictures represented by the first bitstream when the pictures represented by the first bitstream are received as a progressive sequence so that pictures represented by the second bitstream are output as an interlaced sequence.

12. The method as claimed in claim 1, further comprising a step of de-interlacing pictures represented by the first bitstream when the pictures represented by the first bitstream are received as an interlaced sequence so that pictures represented by the second bitstream are output as a progressive sequence.

13. A transcoding method, comprising the steps of:

receiving a first bitstream of compressed image data representing a main image;

obtaining first and second motion information from the first bitstream;

weighting the first and second motion information;

utilizing the first motion information to extrapolate third motion information for a second bitstream of compressed image data if the first motion information outweighs the second motion information, the second bit stream representing a portion of the main image; and outputting the second bitstream.

14. The transcoding method of claim 1, wherein the step of obtaining the first and second motion information includes the steps of:

determining whether an examined motion information is within a predetermined temporal range; and obtaining the examined motion information if the examined motion information is determined to be within the predetermined temporal range.

15. The transcoding method of claim 1, wherein the step of weighting the first and second motion information includes the steps of:

calculating at least one of an overlap weight, a temporal weight, and a rounding weight for a selected motion information; and deriving a weight value for the selected motion information based on at least one of the calculated weights.

16. A transcoding method, comprising the steps of:

receiving an input bitstream of compressed data having an input coding parameter;

obtaining first and second motion vectors from the input bitstream;

weighting the first and second motion vectors;

utilizing the first motion vector to extrapolate a third motion vector for an output bitstream of compressed image data if the first motion vector outweighs the second motion vector, the output bitstream having an output coding parameter that is different than the input coding parameter of the input bitstream; and outputting the output bitstream of compressed data.

17. The transcoding method of claim 16, wherein the step of obtaining the first and second motion vectors includes the steps of:

determining whether an examined motion vector is within a predetermined temporal range; and obtaining the examined motion vector if the examined motion vector is determined to be within the predetermined temporal range.

18. The transcoding method of claim 16, wherein the step of weighting the first and second motion vectors includes the steps of:

calculating at least one of an overlap weight, a temporal weight, and a rounding weight for a selected motion vector; and deriving a weight value for the selected motion vector based on at least one of the calculated weights.

19. The transcoding method of claim 16, wherein the step of weighting the first and second motion vectors includes the steps of:

calculating at least one of an overlap weight, a temporal weight, and a rounding weight for a selected motion vector; and deriving weight values for x and y components of the selected motion vector based on at least one of the calculated weights.

20. The transcoding method of claim 16, wherein the input coding parameter is at least one of a group of pictures (GOP) structure, a picture size, a bit rate, a frame picture format, a field picture format, a progressive sequence, and an interlaced sequence.

21. The transcoding method of claim 16, wherein the output coding parameter is at least one of a group of pictures (GOP) structure, a picture size, a bit rate, a frame picture format, a field picture format, a progressive sequence, and an interlaced sequence.

22. The transcoding method of claim 16, wherein the first and second motion vectors are first and second motion vector clusters.

* * * * *